US007272716B2

United States Patent
Haller et al.

(10) Patent No.: US 7,272,716 B2
(45) Date of Patent: Sep. 18, 2007

(54) ENTERPRISE SECURE MESSAGING ARCHITECTURE

(75) Inventors: Jochen Haller, Karlsruhe (DE); Laurent Gomez, Le Cannet (FR); Joachim Posegga, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 767 days.

(21) Appl. No.: 10/638,545

(22) Filed: Aug. 12, 2003

(65) Prior Publication Data
US 2004/0068649 A1    Apr. 8, 2004

Related U.S. Application Data

(60) Provisional application No. 60/406,921, filed on Aug. 30, 2002.

(51) Int. Cl.
*H04L 9/00* (2006.01)
*G06F 11/00* (2006.01)
(52) U.S. Cl. .................. 713/156; 380/270; 705/28; 705/500; 714/25; 714/48
(58) Field of Classification Search ............. 380/270; 713/153, 156
See application file for complete search history.

(56) References Cited

U.S. PATENT DOCUMENTS 5,819,177 A * 10/1998 Vucetic et al. ............ 455/425
6,330,499 B1 * 12/2001 Chou et al. ................ 701/33
6,438,471 B1 * 8/2002 Katagishi et al. ............ 701/33
6,647,272 B1 * 11/2003 Asikainen ................ 455/466
2002/0062251 A1    5/2002 Anandan et al.
2004/0015689 A1 * 1/2004 Billhartz ................. 713/156

FOREIGN PATENT DOCUMENTS

WO    WO99/27678 A2    6/1999
WO    WO 00/31931 A1    6/2000

OTHER PUBLICATIONS

Nguyen et al., Security Routing Analysis for Mobile Ad Hoc Networks, Department of Interdisciplinary Telecommunications, University of Colorado at Boulder, Spring 2000.*
Zhou et al., Securing Ad Hoc Networks, IEEE Network Magazine, vol. 13, No. 6, Nov./Dec. 1999.*

(Continued)

*Primary Examiner*—Gilberto Barron, Jr.
*Assistant Examiner*—Jung Kim
(74) *Attorney, Agent, or Firm*—Fish & Richardson P.C.

(57) ABSTRACT

An enterprise system with secure wireless messaging includes an application service to process a message. The enterprise system also includes a security service that uses a cryptographic technique to transform between the message and a secure message that is based on the message. A communication service communicates the secure message with a mobile client using a public network. The message may be secured using a cryptographic technique to provide end-to-end security. The enterprise system also may include an information service including information indicating occurrence of a triggering event. The information indicating occurrence of a triggering event may cause the enterprise system to push a secure message to the mobile client.

22 Claims, 5 Drawing Sheets

OTHER PUBLICATIONS

"Gateway," http://www.webopedia.com/TERM/g/gateway.html, undated, printed from the Internet Nov. 27, 2002, 1 pg.

Gleckman, Howard, "Don't Click on the Dotted Line Just Yet," *Business Week*, Nov. 8, 1999, No. 3654, p. 120.

"Next Messaging: An Introduction to SMS, EMS and MMS," undated, http://www.mobilewhitepapers.com/pdf/messaging.pdf, printed from the Internet Nov. 26, 2002, 25 pgs.

"PKI," http://www.webopedia.com/TERM/P/PKI.html, undated, printed from the Internet Nov. 26, 2002, 3 pgs.

"Short Message Service," http://www.webopedia.com/TERM/S/short_message_service.html, undated, printed from the Internet Nov. 26, 2002, 2 pgs.

"STARSIM Advanced Mobile Commerce," http://www.gdai.com/pdfdocs/starism.pdf, undated, printed from the Internet Nov. 26, 2002, 8 pgs.

"STARSIM Browser Wireless Internet Now," www.gdai.com/pdfdocs/starsim_browser.pdf, undated, printed from the internet Nov. 26, 2002, 8 pgs.

"Success 4 WAP' White Paper," http://www.mobilewhitepapers.com/pdf/wap.pdf, Feb. 2001, printed from the Internet Nov. 26, 2002, 22 pgs.

"Tunneling," http://www.webopedia.com/TERM/T/tunneling.html, undated, printed from the Internet Nov. 27, 2002, 1 pg.

\* cited by examiner

ENTERPRISE SECURE MESSAGING ARCHITECTURE

CROSS-REFERENCE TO RELATED APPLICATIONS

This application claims priority from U.S. Provisional Application No. 60/406,921, filed Aug. 30, 2002, titled SECURE MESSAGING ARCHITECTURE, which hereby is incorporated by reference in its entirety for all purposes.

TECHNICAL FIELD

The disclosure relates to secure mobile messaging.

BACKGROUND

A backend enterprise systems, such as SAP R/3, may provide customer relationship management (CRM) data functions. An equipment service company, for example, may use an enterprise system with CRM functionality (a CRM system) to improve customer service provided by the company. The CRM system may store customer information, such as, for example, the name and address of customer installations, contact information, model numbers and serial numbers of installed equipment, and past service and maintenance records related to the installed equipment.

When a customer reports that an installed piece of equipment requires service, the company may use the CRM system to create a problem ticket, to dispatch a service technician, or to provide the service technician with information required to make the requested repair. The CRM system may store enterprise information associated with the customer and with interactions of the customer with the company.

Employees of the company (e.g., sales persons, consultants, or service technicians) may interact frequently with the customer or with the company while not at a company location. The employees, may rely on unsecured mobile communications to receive assignments, place orders, and otherwise interact with the customer or the company while moving from one location to the next, or while otherwise away from a company location.

SUMMARY

In one general aspect, an enterprise system with secure wireless messaging includes an application service to process a message. The enterprise system also includes a security service that uses a cryptographic technique to transform between the message and a secure message that is based on the message. A communication service communicates the secure message with a mobile client using a public network. The message may be secured using a cryptographic technique to provide end-to-end security. The enterprise system also may include an information service including information indicating occurrence of a triggering event. The information indicating occurrence of a triggering event may cause the enterprise system to push a secure message to the mobile client.

Implementations may include one or more of the following features. The cryptographic technique used to secure the message may include a symmetric and/or asymmetric cryptographic technique. For example, an asymmetric cryptographic method may be used to secure the secure message using encryption and/or a digital signature based on a private key and a public key. A public key infrastructure, such as, for example, a certification authority or a web of trust, may be used to certify whether the public key is associated with a represented originator of the encrypted and/or digitally signed secure message.

The secure message may include an alert that the enterprise service pushes to the mobile client based information indicating occurrence of a triggering event. The information indicating occurrence of a triggering event may be based on a request for a service or for information, and the resulting alert may notify a service provider that a service is required. The mobile client may generate a second secure message to respond to the alert of the first secure message. The response may include an acknowledgement of the alert or an authorization (e.g., using a digital signature) based on the alert.

These general and specific aspects may be implemented using a method, a system, or a computer program, or any combination of systems, methods, and computer programs. Other features will be apparent from the following description, including the drawings, and from the claims.

DESCRIPTION OF DRAWINGS

Like reference symbols in the various drawings indicate like elements.

DETAILED DESCRIPTION

Figure 1:
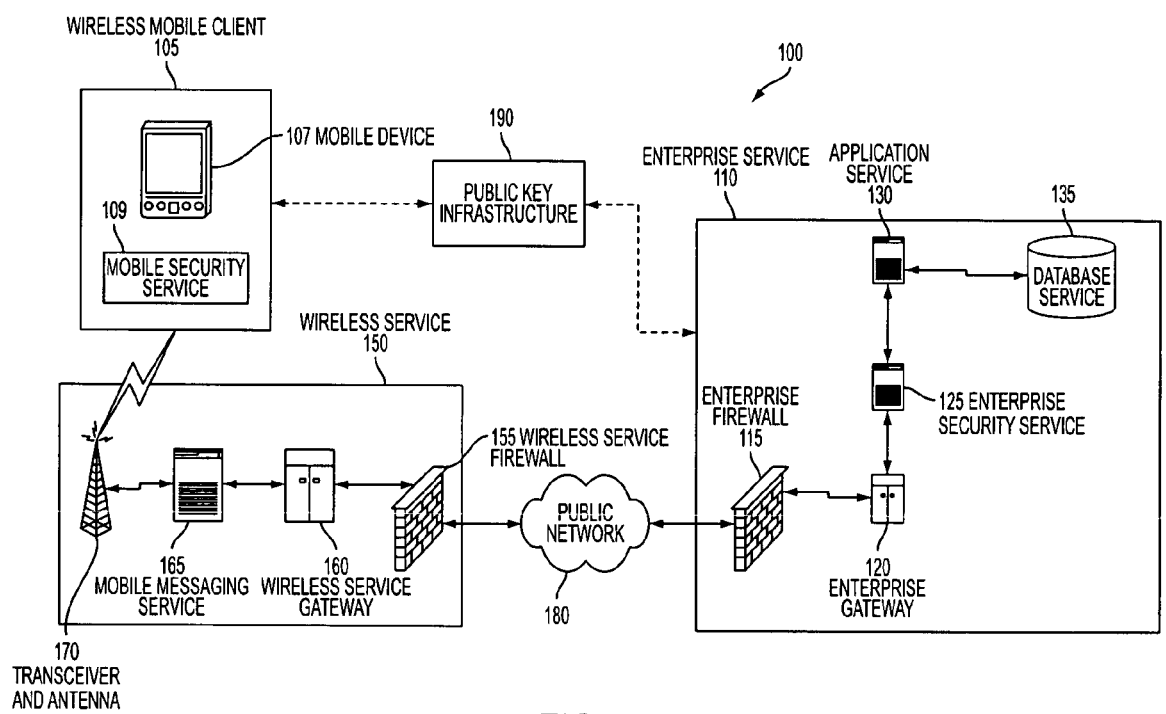
FIG. 1 is a schematic diagram of an enterprise system for providing secure messaging between a mobile device and an enterprise service.

Referring to FIG. 1, a generalized enterprise system 100 may provide end-to-end secure messaging between one or more mobile clients 105 and an enterprise service 110. The mobile clients 105 and the enterprise service 110 may communicate secure messages using a wireless service 150 and a public network 180. Exemplary components of the enterprise system 100 are described in greater detail below.

The mobile clients 105 generally may include any device, system, and/or piece of code that relies on another service to perform an operation and that communicates using a wireless communication path. For example, the mobile clients 105 may include a mobile device 107 such as a cellular telephone, a personal digital assistant (PDA), a pen-based computer, a notebook computer, or a workstation. The mobile clients 105 also may include a Web browser, an email client, a synchronization client (e.g., a calendar synchronization client, a task list synchronization client), an instant messaging (IM) client, a business productivity application (e.g., a word processor, a spreadsheet), and/or an operating system or operating system kernel residing on a mobile device.

The mobile client 105 additionally may include a mobile security service 109 that may perform a secure storage function and a secure execution function. The mobile security service 109 may generate or interpret secure messages based on data encryption techniques, or to digitally sign a message. The mobile security service 109 may employ a symmetrical cryptographic method, such as the data encryption standard (DES) or 3DES (triple DES). The mobile security service 109 also may employ an asymmetric cryptographic method, such as, for example, the Rivest, Shamir, and Adelman (RSA) method or pretty good privacy (PGP). In a symmetric cryptographic method, a shared key is employed that is used both to encrypt and to decrypt a message. The shared key may be used once to secure a given message and discarded, or the mobile security service 109 may store the shared key for repeated use. In either event, the shared key may be communicated to the enterprise service 110 using conventional key exchange methods.

In an asymmetric cryptographic method, a key-pair is used to encrypt and decrypt a message. The key-pair includes a public key for encrypting a message (but that provides no decryption benefit) and an associated private key for decrypting the message. Asymmetric cryptographic methods also may be used to create a digital signature. The digital signature may authenticate that a message author actually is the person claimed and that the message has not been modified after it was sent. Similar to encryption, a private key is used to create a digital signature while a message recipient uses an associated public key to authenticate the digitally signed message. The mobile client 105 may retain the private key, using for example the mobile security service 109, but, for example, may make the public key available to the enterprise service through publication. A public key infrastructure (PKI) 190 may certify to the enterprise service 110 that the public key associated with the message corresponds to the person whose identity is claimed in the message. The PKI fills a role similar to that of a notary public who witnesses the correct identity of a signer of a paper document. The PKI may include, for example, a certification authority or a web of trust.

In one implementation, the mobile security service 109 includes a smart card (e.g., a subscriber identify module (SIM) card) or other suitable processor and/or memory card that is capable of providing secure storage and secure execution (e.g., of a security application). The SIM card may decrypt received secure messages, encrypt requests or replies to form outgoing secure messages, and may communicate with the enterprise service 110 using the secure messages. The secure messages may include voice and/or non-voice data.

The mobile client 105 may format a received message using a standard protocol for wireless applications, such as, for example, the wireless markup language (WML). The formatted message may include a form that a user of the mobile client 105 may use to submit information to or make a request of the enterprise service 110.

The enterprise service 110 generally may include, for example, any device, system, and/or piece of code configured to perform an operation requested by a mobile client 105 (e.g., a cellular telephone, a PDA, a Web browser, another service). An enterprise firewall 115 may protect the enterprise service 110 from the public network 180. The enterprise service 110 may include an enterprise gateway 120 to receive messages from the public network 180 and to transform them into a communication protocol of the enterprise service 110 (e.g., asynchronous transfer mode (ATM) or fiber distributed data interface (FDDI)), or vice versa.

The enterprise service 110 may include an enterprise security service 125. The enterprise security service 125 may generate or interpret secure messages based on symmetric and/or asymmetric data encryption methods. The cryptographic methods of the enterprise security service 125 may be selected to operate seamlessly with the cryptographic methods of the client security service 107. The security service 125 may be implemented, for example, using commercially available software such as the Giesecke & Devrient STARSIM browser system. The STARSIM browser system may allow the enterprise service 110 to send information securely across the public network 180, to the mobile client 105.

The enterprise service 110 may include an application service 130 (e.g., a web application server (WAS) such as SAP WAS version 6.20) configured to communicate with a database service 135, such as, for example, a reliable database management system (RDBMS) or an SAP R/3 system. The database service 135 may include, for example, enterprise information related to enterprise services, users, and/or customers. The application service 130 may be configured to dispatch a message to the mobile client 105 using a push-messaging technique. For example, the application service 130 may poll the database service 135 constantly to identify a triggering event (e.g., the occurrence of a particular event or for the presence of predetermined information). In another aspect, the database service 135 itself may note the triggering event and notify the application service 130. In either event, the application service 130 may push information (e.g., an alert message) to the mobile client 105 based on the triggering event.

The application service 130 also may employ a pull-messaging technique to provide an available message to the mobile client 105 responsive to a query of the mobile client 105. Pull-messaging may be viewed as a subset of push-messaging in which the triggering event is based on a direct query of a client.

In addition, the enterprise service 110 may include a CRM service, an enterprise resource planning (ERP) service, an email service, an accounting service, a resource management service, a synchronization service (e.g., a calendar synchronization service, a task list synchronization service), a print service, a file access service, an instant messaging (IM) service, an operating system, an operating system kernel, an authentication service, an authorization service, and/or any combination of these or other services.

Communication between the mobile clients 105 and the enterprise service 110 as well as other communications within the enterprise system services generally occur using the wireless service 150 and the public network 180. A wireless service firewall 155 may protect the wireless service 150 from the public network 180. The wireless service 150 may include a wireless service gateway 160 to receive messages from the public network 180 and to translate them from a wireless messaging protocol (e.g., short messaging service (SMS)) of the wireless client 105 and into a communication protocol (e.g., the Internet protocol (IP), the transfer connection protocol (TCP), the hypertext transfer protocol (HTTP)) of the public network 180, or vice versa. For example, SMS messages typically are limited to a fixed number of bytes (e.g., 160 bytes). The wireless service gateway 160 may break a message received from the public network 180 into a series of smaller SMS message packets. Each SMS message packet may include information to allow reassembly of the original message by the mobile client 105. On the other hand, the wireless service gateway 160 may concatenate multiple SMS messages from the mobile client 105 into a larger message for transport over the public network 180. In either case, the wireless service 150 may include a mobile messaging service 165 that communicates the messages between the gateway 150 and the mobile client 105 using antenna and transceiver 170.

The public network 180 typically allows direct or indirect communication between the system services (e.g., end-to-end secured communication between the client 105 and the wireless service 150, and the enterprise service 110), irrespective of physical or logical separation. Nevertheless, the public network 180 may be unsecured itself, and messages transported over the public network 180, for example, may be subject to interception, eavesdropping or counterfeiting absent some form of externally provided security (e.g., encryption used to provide end-to-end security).

Each of the wireless service 150, the public network 180, and the enterprise service 110 may further include various mechanisms for delivering voice and/or non-voice data, such as, for example, the short message service (SMS), the wireless application protocol (WAP), the transport connection protocol (TCP), the Internet protocol (IP), the World Wide Web, one or more local area networks (LANs) and/or one or more wide area networks (WANs). The wireless service 150, the public network 180, and the enterprise service 110 also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

One or more other services may be included in the components of enterprise system 100 and/or these components (hereinafter the system services) may be included as part of one or more other services. For example, the system services may include or be included in a general-purpose or a special-purpose computer (e.g., a personal computer, a PDA, or a device specifically programmed to perform certain tasks), at least one Local Area Network (LAN), and/or at least one Wide Area Network (WAN). Either way, the response to and execution of instructions received by any or all of the system services may be controlled by, for example, a program, a piece of code, an instruction, a device, a computer system, or a combination thereof, for independently or collectively instructing the services to interact and operate as described herein.

Figure 2:
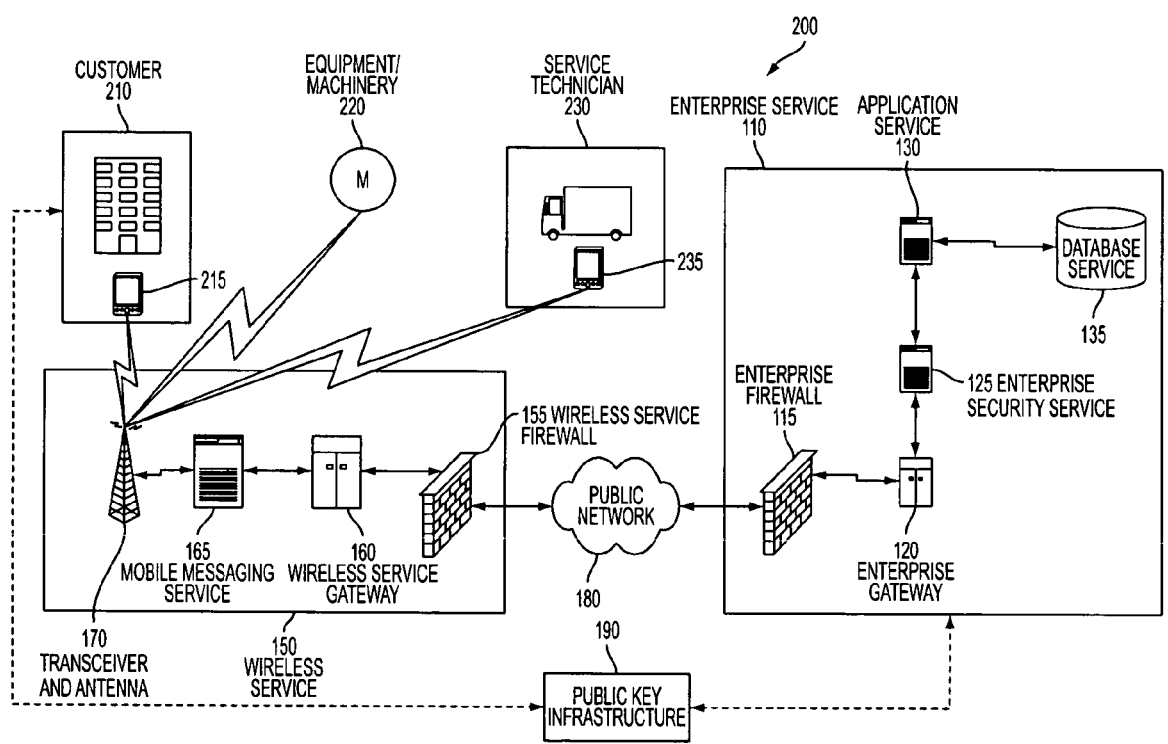
FIG. 2 is a schematic diagram of an enterprise system, as in FIG. 1, that illustrates an exemplary secure messaging system used by an equipment service company to provide an on-call repair service.

FIG. 2 describes an enterprise system 200 that is used by an equipment service company to provide an on-call repair service. Enterprise system 200 is similar generally to enterprise system 100 of FIG. 1. The equipment service company sells, installs, and services the equipment in various businesses in a wide geographical area. A team of service technicians responds to service calls and performs regularly scheduled maintenance on the equipment. The coordination and scheduling of service calls is handled using the enterprise service 110. The enterprise service 110 also is configured to track, for each customer 210, information such as the model and serial numbers of installed equipment, previous maintenance records, contact information, locations, and other pertinent information. When equipment 220 is in need of service, the company may dispatch a service technician 230 to the equipment 220 to perform the necessary repairs.

A customer 210 may submit a request to the enterprise service 110 for service of the equipment 220. The request may be secure and may include a digital signature to verify the origin of the request and in some cases to authorize the service. In response, enterprise service 110 may push a secured alert message to a service technician 230. The alert message may identify the equipment 220 needing service as well as the service required (e.g., scheduled service or emergency service), and may direct the service technician 230 to perform the required service immediately or at a predetermined time. The service technician 230 may acknowledge the service directive using a secure message to the enterprise service 110. In response to the acknowledgement of the service technician 230, the enterprise service 110 may send a secure message to the customer 210 informing that the service technician 230 will proceed with the requested repair.

In another implementation, the alert message to the service technician 230 may be based on a maintenance schedule related to the equipment 220 that is maintained by the enterprise service 110, or on a request for service by the equipment 220 itself. In any event, the enterprise service 110 may push a secure alert message to the customer 210 to request authorization for the maintenance. The customer 210 may authorize the maintenance using a secure message including a digital signature. Once service is authorized, the enterprise service 110 may push an alert to the service technician 230 directing that service be performed.

Figure 3:
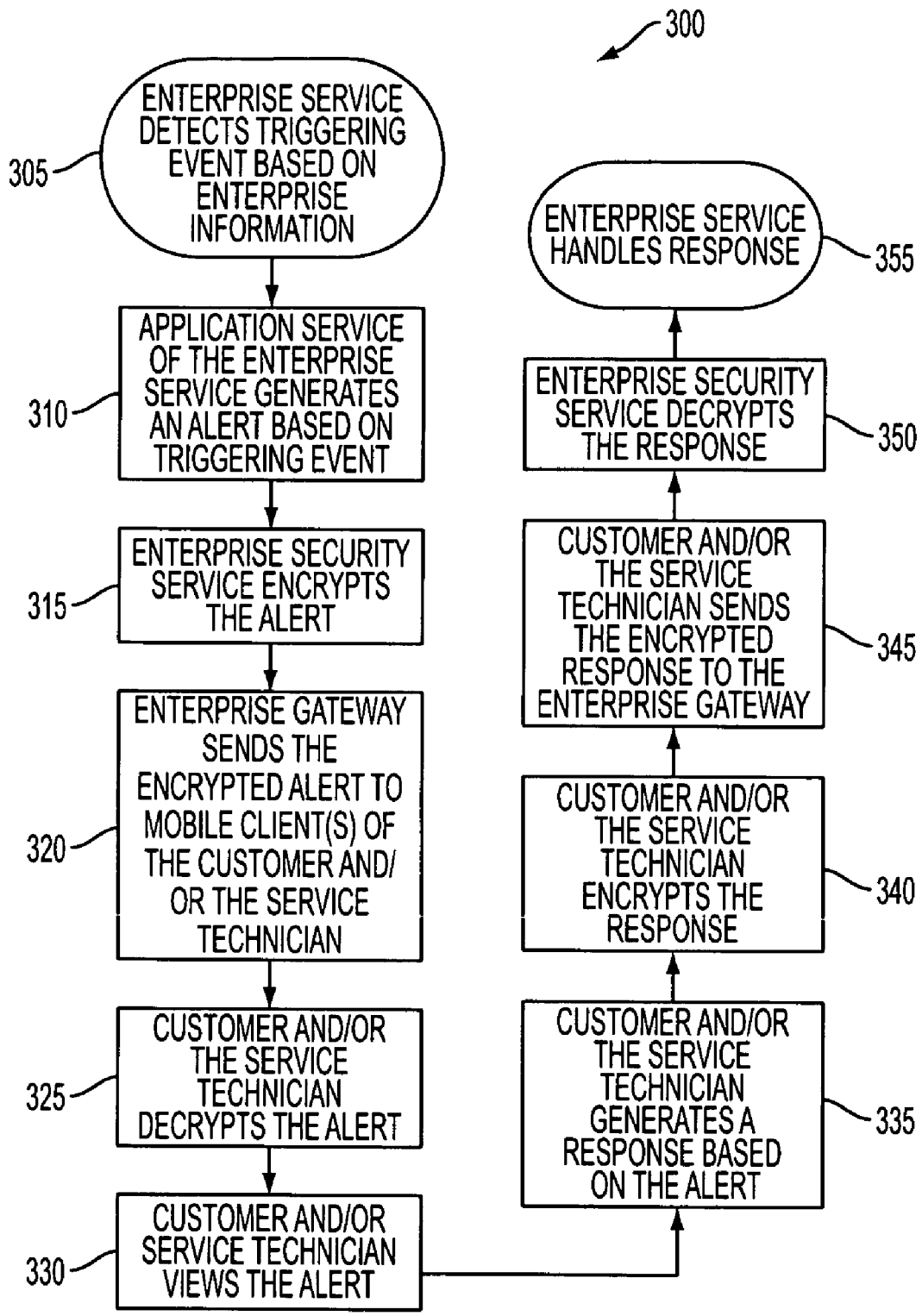
FIGS. 3-5 are schematic flow diagrams illustrating systematic processes implementable by the enterprise systems of FIGS. 1-2.
Figure 4:
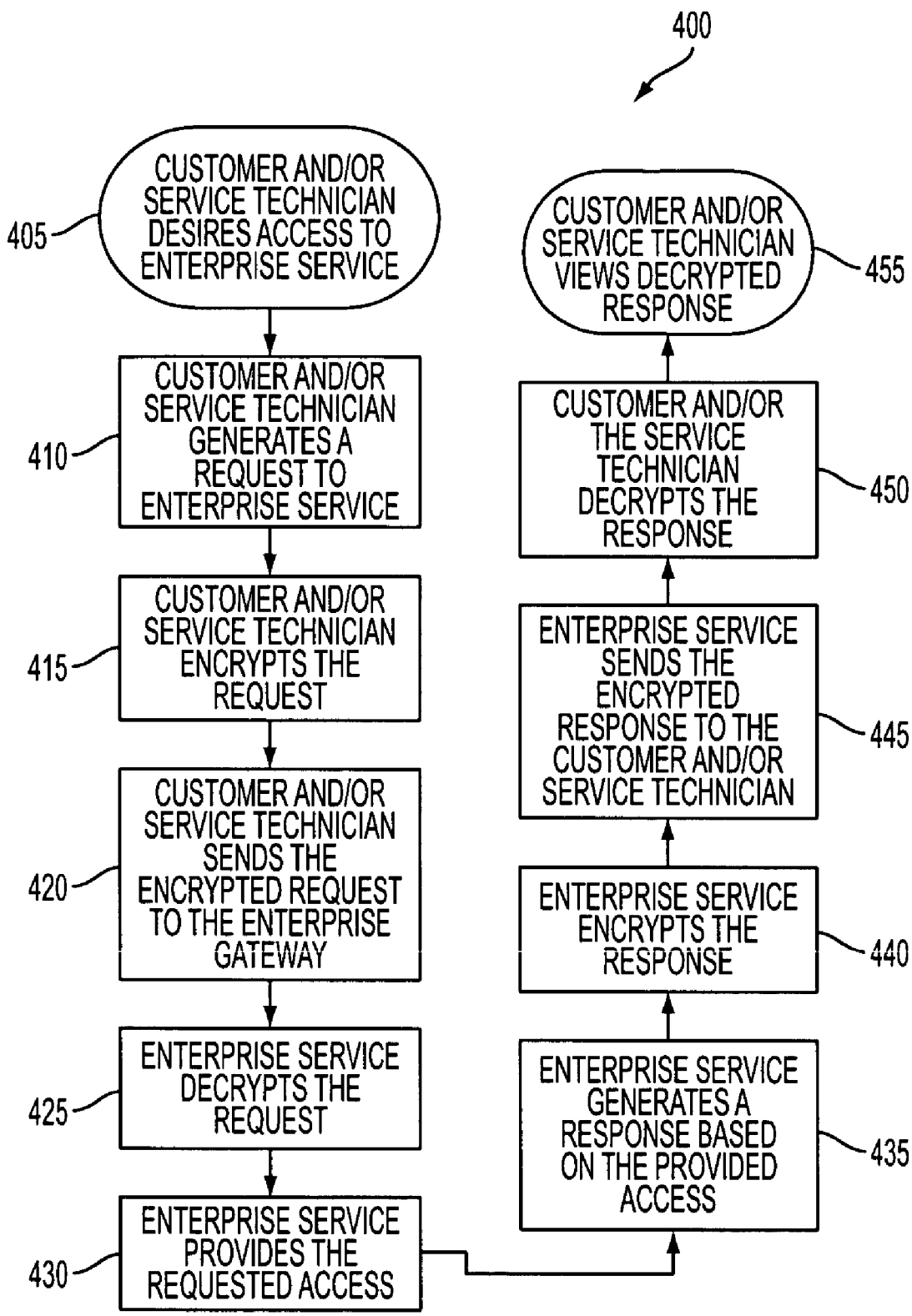
Figure 5:
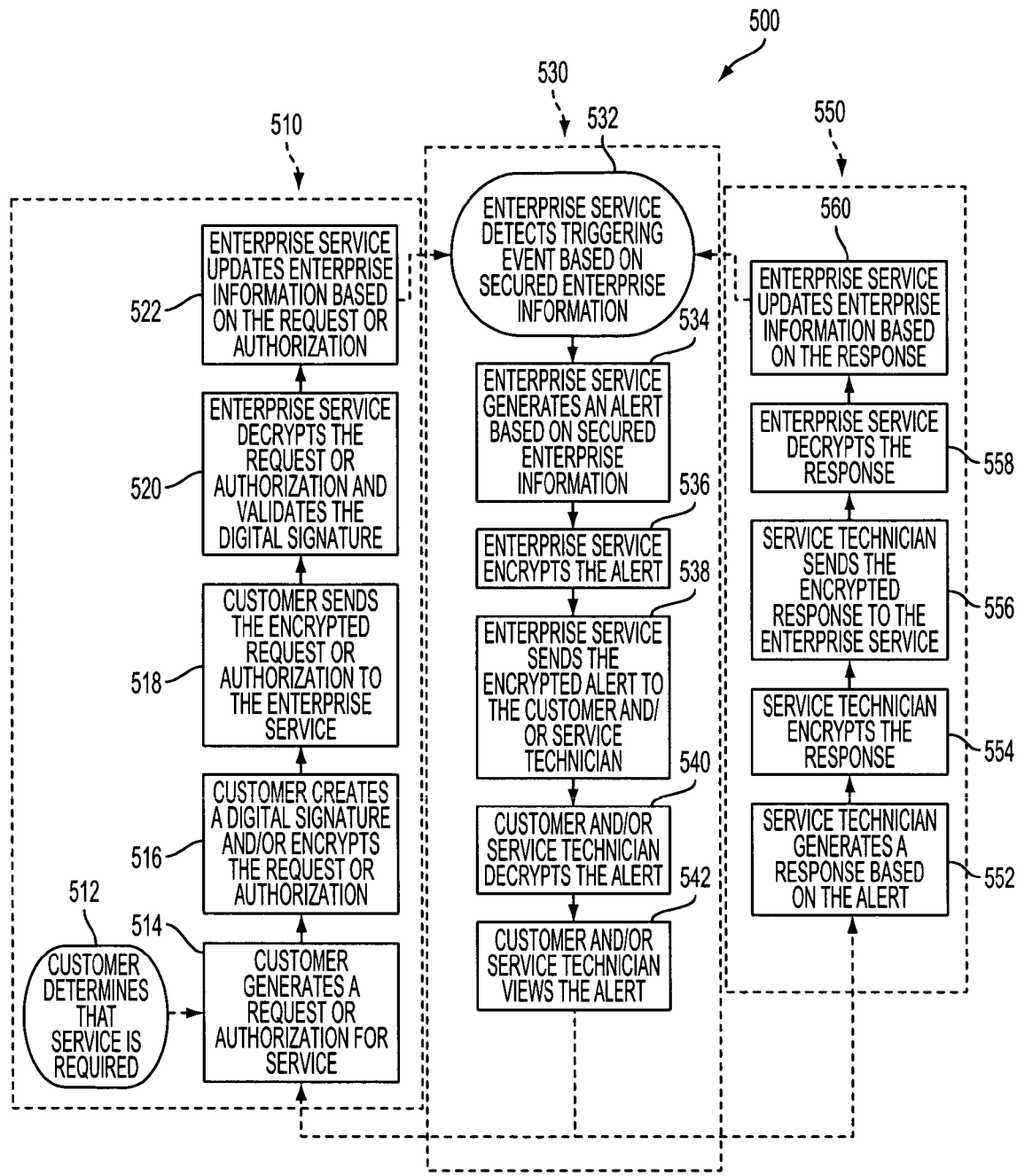

FIGS. 3-5 illustrate similar systematic processes implementable by the systems of FIGS. 1-2. For clarity, but by way of example only, the process of FIG. 3 is described with respect to the equipment service company of FIG. 2. For brevity, the similar processes of FIGS. 4-5 are described to omit excessive similar detail.

Referring to FIG. 3, a systematic process is provided by which the enterprise service 110 may push an alert message to the user of a mobile device (e.g., a customer, a service technician) using secure messaging. Initially, the enterprise service 110 detects a triggering event that causes generation of an alert message (step 305). The triggering event may be detected by either the application service 130 or the database service 135. For example, a customer 210 may call an equipment service request into a customer service center. A customer service representative may obtain information that is needed to fulfill the service request (e.g., an equipment type, a detailed description of requested service, a time of the request, an urgency of the request, a service account number) and may enter the information into the enterprise service 110. In another example, the customer may use a web browser to make the service request and to provide the associated information.

In response to the service request, the enterprise service 110 may use the application service 130 to generate an alert based on the service request (step 310). For example, the application service 130 may query the database service 135 to determine an appropriate service technician 230 to handle the service request and a mobile identification associated with the service technician 230 (e.g., a phone number of mobile client 235). Scheduling may be performed using any conventional techniques and may rely on information such as skills, certifications, and experiences of available service technicians, their location relative to the equipment for which service is requested, and so forth. The alert message may inform the service technician 230 of the service request and may include information required by the service technician 230 to perform the requested service.

The enterprise service 110 may use the enterprise security service 125 to encrypt the alert message generated by application service 130 (step 315). The enterprise service 110 may then use the enterprise gateway 120 to send the encrypted message to the mobile client 235 of the service technician 230 (step 320). For example, the enterprise gateway 120 may send the encrypted message across the public network 180 to the wireless service 150. The wireless service gateway 155 may translate the encrypted message into a format (e.g., an SMS format) acceptable to the mobile messaging service 165. The mobile messaging service may employ the transceiver and antenna 170 to provide the encrypted message to the mobile client 235.

Upon receipt, the mobile client 235 may decrypt the encrypted alert message (step 325) and may provide the alert message to the service technician 230 (step 330). The mobile client 235 may display service information of the alert message (e.g., equipment type, a brief description of requested service, an equipment location, a customer name) to the service technician 230, for example, as a WML document. The alert message also may request that the service technician 230 confirm receipt of the service assignment by sending a response. The response may indicate, for example, acceptance of the assignment and/or an estimated time to arrive at the service site.

As requested by the alert message, the service technician 230 may use the mobile client 235 to generate a response based on the alert (step 335). The mobile client 235 may then encrypt the response (step 340) using, for example, a security application running on a SIM card. The encrypted response may then be sent to the enterprise service 110 (step 345) for translation by gateway 120, decryption by the enterprise security service 125 (step 350), and processing by the application service 130 (step 130).

Referring to FIG. 4, a systematic process 400 is provided by which a user of a mobile client may request and receive (i.e., pull) information from an enterprise service 110 using secure messaging. Initially, a service technician 230 requires additional information regarding equipment that he is scheduled to service (step 405). For this reason, the service technician 230 uses mobile client 235 to generate a request for the additional information from the enterprise service 110 (step 410). The request is encrypted (step 415) and sent to the enterprise service 110 (step 420). The enterprise service 110 decrypts the request when it is received (step 425) and accesses the requested additional information (step 430). Based upon the additional information requested, the enterprise service 110 generates a response to the request (step 435). The enterprise service 110 then encrypts the response (step 440) and sends the encrypted response to the mobile client 235 of the service technician 230 (step 445). The mobile client 235 decrypts the response received from the enterprise service 110 (step 450) and provides the additional information of the response to the service technician 230 (step 455).

Referring to FIG. 5, a systematic process 500 is provided for using secure messaging to communicate between the enterprise service 110, the customer 210, and the service technician 230. Initially the customer 210 may use a mobile client 215 to communicate a service request to the enterprise service 110 (steps 510). More specifically, the customer 210 may determine that service is required (step 512) and may use the mobile client 215 to generate a service request message (step 514). The mobile client 215 may secure the service request message using a digital signature to provide verification of origin and/or to provide non-repudiation (step 516). The mobile client 215 also may use encryption, whether symmetric or asymmetric, to secure the service request message (step 516). The mobile client 215 then may send the secured service request message to the enterprise service 110 (step 518), and the enterprise service 110 may decrypt the secured service request message and/or validate the digital signature. Based on the service request message, the enterprise service 110 may update the enterprise information (step 522).

The enterprise service 110 may then respond to the service request message (steps 530). Specifically, the enterprise service 110 may detect a triggering event based on the request message received from the customer 210 (step 532). In response to the triggering event, the enterprise service 110 may generate an alert message based on the triggering event (e.g., the request message) (step 534). The enterprise service 110 then may encrypt the alert message (step 536) and send the encrypted alert message to the mobile client 235 of the service technician 230 (step 538). The mobile client 230 of the service technician 235 may decrypt the alert message (step 540) and may provide the alert message to the service technician 230 (step 542). The alert message may, for example, alert the service technician 230 of the requested service and may request that the service technician 230 confirm his availability to perform the service in a response message.

The service technician 230 may provide a response message as requested by the alert message (steps 550). More specifically, the service technician 230 may use his mobile client 235 to generate a response message based on the alert (step 552). The mobile client 235 of the service technician 230 may encrypt the response message (step 554) and may send the encrypted response to the enterprise service 110 (step 556). The enterprise service 110 then may decrypt the response (step 558) and may update the enterprise information based on the response (step 560).

Based on the response of the service technician 230, the enterprise service 110 may provide an alert to the customer 210 confirming that the requested service is scheduled to be performed (steps 530).

In another aspect of process 500, the enterprise service 110 may provide an alert to the service technician 230 (steps 530) where the alert is triggered by a scheduled maintenance calendar rather than by a direct request of the customer 210. After the service technician 230 uses a response message to confirm availability to perform the service (steps 550), the enterprise service 110 may provide an alert to the customer 210 requesting authorization for the scheduled maintenance (steps 530). The customer 210 may send to the enterprise service 110 a digitally signed authorization (steps 510) and the enterprise service 110 may send an alert to the service technician 230 to notify the service technician 230 that the service is authorized (steps 550).

Other implementations are within the scope of the following claims. The disclosure describes secure mobile messaging implemented in an enterprise system that provides customer relationship management. Nevertheless, secure mobile messaging may be implemented in any enterprise system that requires interaction between an enterprise service and mobile users of that service. Secure mobile messaging may be implemented in an enterprise system that provides, for example, supplier relationship management, supply chain management, mobile business management, collaborative business management, product lifecycle management, and/or any combination of these or other enterprise services that interact with mobile users.

What is claimed is:

1. A method for using secure messaging to provide confidential service-related communications among an enterprise service, a customer, and a service technician, the method comprising:

generating a service request message using a mobile client of a customer;

securing the service request message with a digital signature using the mobile client of the customer;

symmetrically or asymmetrically encrypting the service request message using the mobile client of the customer;

transmit the encrypted service request message from the mobile client of the customer to an enterprise service;

decrypting the secured service request message using the enterprise service;

validating the secured service request based upon the decrypted digital signature using the enterprise service;

updating secured enterprise information based on the decrypted service request message using the enterprise service;

detecting a triggering event based upon the decrypted service request message using the enterprise service;

automatically selecting a service technician;

generating an alert message based upon the triggering event using the enterprise service;

encrypting the alert message using the enterprise service;

transmitting the encrypted alert message to a mobile client of the selected service technician;

decrypting the encrypted alert message at the mobile client of the selected service technician;

generating a response message at the mobile client of the selected service technician;

encrypting the response message at the mobile client of the selected service technician;

transmitting the encrypted response message from the mobile client of the selected service technician to the enterprise service;

decrypting the encrypted response message at the enterprise service;

updating the secured enterprise information based upon the decrypted response using the enterprise service; and transmitting a confirmation to the mobile client of the customer based upon the decrypted response message.

2. The method of claim 1, wherein the service request message is encrypted based on 3DES.

3. The method of claim 1, further comprising configuring the enterprise service to receive a second secured service request, based on the alert, generated by the mobile client of the customer.

4. A method for using secure messaging to provide confidential service-related communications among an enterprise service, a customer, and a service technician, the method comprising:

receiving an encrypted service request message;

decrypting the service request message;

validating the service request message based on a digital signature stored with the service request message;

updating secured enterprise information based on the decrypted service request message;

detecting a triggering event based on the secured enterprise information;

automatically selecting a service technician;

generating an alert message based on the triggering event;

encrypting the alert message;

transmitting the encrypted alert message to a mobile client of the selected service technician;

receiving an encrypted response message from the mobile client of the selected service technician;

decrypting the encrypted response message;

updating the secured enterprise information based on the decrypted response message; and transmitting a confirmation message to a mobile client of a customer based on the decrypted response message.

5. The method of claim 4, wherein the triggering event represents an occurrence of a particular event or a presence of predetermined information.

6. The method of claim 4, wherein the triggering event is a direct request by the customer.

7. The method of claim 4, wherein the triggering event is a request for enterprise information.

8. The method of claim 4, wherein the triggering event is based on a direct query of at least one of the mobile client of the selected service technician and the mobile client of the customer.

9. The method of claim 4 wherein the triggering event is generated by a scheduled maintenance calendar.

10. The method of claim 4, wherein the secured enterprise information is polled to determine the presence of predetermined information, and the presence of the predetermined information generates the triggering event.

11. The method of claim 4, wherein the alert message informs the selected service technician of the service request.

12. The method of claim 11, wherein the alert message further includes service information required to perform the requested service.

13. The method of claim 4, wherein the alert message includes a request to the selected service technician that the service technician confirm his availability to perform the service.

14. The method of claim 4, wherein the alert message is encrypted using symmetric cryptography.

15. The method of claim 4, wherein the response message is decrypted using symmetric cryptography.

16. The method of claim 4, wherein the encrypted service request message includes an authorization.

17. The method of claim 4, wherein the encrypted service request message is an alert to notify an enterprise service that service is required.

18. The method of claim 4, wherein the triggering event is a scheduled service or an emergency service.

19. An enterprise service for effectuating secure messaging to provide confidential service-related communications among the enterprise service, a customer, and a service technician, the enterprise service comprising:

an enterprise gateway configured to:
receive an encrypted service request message,
transmit an encrypted alert message to a mobile client of a selected service technician,
receive an encrypted response message from the mobile client of the selected service technician, and
transmit a confirmation message to a mobile client of a customer based on the decrypted response message;

an enterprise security service configured to:
decrypt the encrypted service request message,
validate the service request message based on a digital signature stored with the service request message,
encrypt an alert message, and
decrypt the encrypted response message; and an application service configured to:
update secured enterprise information based on the decrypted service request message,
detect a triggering event based on the secured enterprise information,
automatically select a service technician,
generate the alert message based on the triggering event, and
update the secured enterprise information based on the decrypted response message.

20. The enterprise service of claim 19, further comprising an enterprise firewall configured to protect the enterprise service from a public network.

21. The enterprise service of claim 19, further comprising a customer relationship management (CRM) service, an enterprise resource planning (ERP) service, an email service, an accounting service, a resource management service, a synchronization service, a calendar synchronization service, a task list synchronization service, a print service, a file access service, an instant messaging (IM) service, an operating system, an operating system kernel, an authentication service, or an authorization service.

22. A computer program product tangibly embodied in a machine-readable storage medium, the computer program product for effectuating secure messaging to provide confidential service-related communications among an enterprise service, a customer, and a service technician, wherein the computer program product comprises instructions that, when read by a machine, operate to cause data processing apparatus to:

receive an encrypted service request message;

decrypt the service request message;

validate the service request message based on a digital signature stored with the service request message;

update secured enterprise information based on the decrypted service request message;

detect a triggering event based on the secured enterprise information;

automatically select a service technician;

generate an alert message based on the triggering event;

encrypt the alert message;

transmit the encrypted alert message to a mobile client of the selected service technician;

receive an encrypted response message from the mobile client of the selected service technician;

decrypt the encrypted response message;

update the secured enterprise information based on the decrypted response message; and transmit a confirmation message to a mobile client of a customer based on the decrypted response message.

* * * * *